US012121183B2

(12) United States Patent
Han et al.

(10) Patent No.: US 12,121,183 B2
(45) Date of Patent: Oct. 22, 2024

(54) POT LID ASSEMBLY AND COOKING UTENSIL

(71) Applicant: IB APPLIANCES US HOLDINGS LLC, Downers Grove, IL (US)

(72) Inventors: Yude Han, Zhejiang (CN); Yi Qin, Ottawa (CA); Jiwei Wang, Ottawa (CA)

(73) Assignee: IB APPLIANCES US HOLDINGS LLC, Downers Grove, IL (US)

( * ) Notice: Subject to any disclaimer, the term of this patent is extended or adjusted under 35 U.S.C. 154(b) by 724 days.

(21) Appl. No.: 17/335,965

(22) Filed: Jun. 1, 2021

(65) Prior Publication Data

US 2021/0378449 A1 Dec. 9, 2021

(30) Foreign Application Priority Data

Jun. 9, 2020 (CN) .......................... 202021049447.5

(51) Int. Cl.
A47J 43/07 (2006.01)
A47J 27/08 (2006.01)
(Continued)

(52) U.S. Cl.
CPC ....... *A47J 43/0711* (2013.01); *A47J 27/0817* (2013.01); *A47J 43/044* (2013.01);
(Continued)

(58) Field of Classification Search
CPC .... A47J 27/0817; A47J 43/044; A47J 43/082; A47J 2043/0449; A47J 36/165;
(Continued)

(56) References Cited

U.S. PATENT DOCUMENTS 4,065,811 A 12/1977 Pauty
4,339,992 A 7/1982 Kurland
(Continued)

FOREIGN PATENT DOCUMENTS

CN 1080158 A 1/1994
CN 1160339 A 9/1997
(Continued)

OTHER PUBLICATIONS

Machine translation of KR 20200022895 A1 performed on Feb. 26, 2024, Seo et al. (Year: 2020).*
(Continued)

*Primary Examiner* — Dana Ross
*Assistant Examiner* — Kevin Guanhua Wen
(74) *Attorney, Agent, or Firm* — Crowell & Moring LLP

(57) ABSTRACT

A pot lid assembly comprises a pot lid, an electric motor assembly and a mixing apparatus. The electric motor assembly is fixed to the pot lid. The mixing apparatus includes a stirring rod and a plurality of stirring vanes. The electric motor assembly includes an electric motor. The electric motor includes a rotary shaft operatively connected with the stirring rod so that the electric motor can cause the stirring rod to rotate. The pot lid is configured to cover the pot body to form a closed cooking space. When the pot lid is removed from the pot body, the rotary shaft is disengaged from the stirring rod, and the mixing apparatus can stand in the cooking space of the pot body, with the stirring vanes serving as a support. The mixing apparatus remains in the cooking space of the pot body after the removal of the pot lid.

20 Claims, 5 Drawing Sheets

(51) Int. Cl.
  *A47J 43/044* (2006.01)
  *A47J 43/08* (2006.01)
  *B01F 27/90* (2022.01)
  *B01F 35/32* (2022.01)
  *B01F 35/41* (2022.01)
  *B01F 35/45* (2022.01)
  *B01F 101/00* (2022.01)

(52) U.S. Cl.
  CPC ............ *A47J 43/082* (2013.01); *B01F 27/90* (2022.01); *B01F 35/3204* (2022.01); *B01F 35/411* (2022.01); *B01F 35/45* (2022.01); *A47J 2043/0449* (2013.01); *B01F 2101/1805* (2022.01); *B01F 2215/0427* (2013.01)

(58) Field of Classification Search
  CPC ... A47J 37/0641; B01F 27/90; B01F 35/3204; B01F 35/411; B01F 35/45; B01F 2101/1805; B01F 2215/0427
  See application file for complete search history.

(56) References Cited

U.S. PATENT DOCUMENTS

| | | | | |
|---|---|---|---|---|
| 4,792,165 | A * | 12/1988 | Nishimura | E05C 19/02 292/19 |
| 5,372,422 | A | 12/1994 | Dubroy | |
| 5,533,801 | A | 7/1996 | Safont et al. | |
| 5,547,279 | A | 8/1996 | Spitzer Sr. | |
| 5,816,136 | A | 10/1998 | Stallings | |
| 5,938,325 | A | 8/1999 | Edwards | |
| 6,629,491 | B1 | 10/2003 | Chan | |
| 9,138,103 | B1 | 9/2015 | Cados | |
| 9,687,103 | B2 | 6/2017 | Conti et al. | |
| 9,693,649 | B2 | 7/2017 | Conti et al. | |
| 10,427,116 | B2 | 10/2019 | Altenritter et al. | |
| 2003/0193835 | A1 | 10/2003 | Richardson | |
| 2008/0223810 | A1 | 9/2008 | Garcia | |
| 2008/0239867 | A1 * | 10/2008 | Gilbert | B01F 13/08 366/146 |
| 2008/0257168 | A1 | 10/2008 | Wolfe | |
| 2012/0189745 | A1 | 7/2012 | DeLong | |
| 2016/0374501 | A1 * | 12/2016 | Logan et al. | A47J 27/62 |

FOREIGN PATENT DOCUMENTS

| | | |
|---|---|---|
| CN | 1751635 A | 3/2006 |
| CN | 201316179 Y | 9/2009 |
| CN | 201551179 U | 8/2010 |
| CN | 201861482 U | 6/2011 |
| CN | 102151094 A | 8/2011 |
| CN | 201968506 U | 9/2011 |
| CN | 202397249 U | 8/2012 |
| CN | 202426351 U | 9/2012 |
| CN | 103006086 A | 4/2013 |
| CN | 102151068 B | 5/2013 |
| CN | 103222810 A | 7/2013 |
| CN | 102551504 B | 7/2014 |
| CN | 204133150 U | 2/2015 |
| CN | 204232841 U | 4/2015 |
| CN | 204232842 U | 4/2015 |
| CN | 204232843 U | 4/2015 |
| CN | 204232943 U | 4/2015 |
| CN | 204318383 U | 5/2015 |
| CN | 204336688 U | 5/2015 |
| CN | 204378845 U | 6/2015 |
| CN | 204378846 U | 6/2015 |
| CN | 204580867 U | 8/2015 |
| CN | 204580980 U | 8/2015 |
| CN | 204813466 U | 12/2015 |
| CN | 105581630 A | 5/2016 |
| CN | 105640297 A | 6/2016 |
| CN | 105662119 A | 6/2016 |
| CN | 105686620 A | 6/2016 |
| CN | 205338585 U | 6/2016 |
| CN | 102334908 B | 9/2016 |
| CN | 105935261 A | 9/2016 |
| CN | 103648344 B | 11/2016 |
| CN | 106731999 A | 5/2017 |
| CN | 206137870 U | 5/2017 |
| CN | 206137942 U | 5/2017 |
| CN | 206182997 U | 5/2017 |
| CN | 206197735 U | 5/2017 |
| CN | 206197736 U | 5/2017 |
| CN | 206197737 U | 5/2017 |
| CN | 106901587 A | 6/2017 |
| CN | 206213124 U | 6/2017 |
| CN | 206239177 U | 6/2017 |
| CN | 107242769 A | 10/2017 |
| CN | 107242803 A | 10/2017 |
| CN | 206560359 U | 10/2017 |
| CN | 206586800 U | 10/2017 |
| CN | 107361621 A | 11/2017 |
| CN | 107361622 A | 11/2017 |
| CN | 107361623 A | 11/2017 |
| CN | 206641761 U | 11/2017 |
| CN | 105581631 B | 12/2017 |
| CN | 103767570 B | 1/2018 |
| CN | 107616676 A | 1/2018 |
| CN | 107773019 A | 3/2018 |
| CN | 207071018 U | 3/2018 |
| CN | 207125647 U | 3/2018 |
| CN | 207323275 U | 5/2018 |
| CN | 207492549 U | 6/2018 |
| CN | 207492550 U | 6/2018 |
| CN | 207492551 U | 6/2018 |
| CN | 207492552 U | 6/2018 |
| CN | 207492553 U | 6/2018 |
| CN | 105640295 B | 7/2018 |
| CN | 207590472 U | 7/2018 |
| CN | 207590473 U | 7/2018 |
| CN | 207590475 U | 7/2018 |
| CN | 207590476 U | 7/2018 |
| CN | 207590477 U | 7/2018 |
| CN | 207590478 U | 7/2018 |
| CN | 207590528 U | 7/2018 |
| CN | 207627014 U | 7/2018 |
| CN | 207755173 U | 8/2018 |
| CN | 207768204 U | 8/2018 |
| CN | 105640294 B | 9/2018 |
| CN | 108606622 A | 10/2018 |
| CN | 108618574 A | 10/2018 |
| CN | 108670015 A | 10/2018 |
| CN | 208114512 U | 11/2018 |
| CN | 208274488 U | 12/2018 |
| CN | 208286832 U | 12/2018 |
| CN | 208286837 U | 12/2018 |
| CN | 208286838 U | 12/2018 |
| CN | 208286839 U | 12/2018 |
| CN | 208286840 U | 12/2018 |
| CN | 208286882 U | 12/2018 |
| CN | 208286891 U | 12/2018 |
| CN | 105640296 B | 1/2019 |
| CN | 109247803 A | 1/2019 |
| CN | 109247840 A | 1/2019 |
| CN | 109247842 A | 1/2019 |
| CN | 208301462 U | 1/2019 |
| CN | 208371517 U | 1/2019 |
| CN | 208435231 U | 1/2019 |
| CN | 208435327 U | 1/2019 |
| CN | 208435342 U | 1/2019 |
| CN | 208463593 U | 2/2019 |
| CN | 109419368 A | 3/2019 |
| CN | 208551083 U | 3/2019 |
| CN | 208551371 U | 3/2019 |
| CN | 208582197 U | 3/2019 |
| CN | 208590899 U | 3/2019 |
| CN | 208640356 U | 3/2019 |
| CN | 208692904 U | 4/2019 |
| CN | 208692940 U | 4/2019 |
| CN | 208692941 U | 4/2019 |
| CN | 208692942 U | 4/2019 |
| CN | 208692943 U | 4/2019 |

(56) References Cited

FOREIGN PATENT DOCUMENTS

| | | | |
|---|---|---|---|
| CN | 208693024 U | 4/2019 | |
| CN | 208693025 U | 4/2019 | |
| CN | 208693027 U | 4/2019 | |
| CN | 208709336 U | 4/2019 | |
| CN | 208709337 U | 4/2019 | |
| CN | 208709338 U | 4/2019 | |
| CN | 208709339 U | 4/2019 | |
| CN | 208709538 U | 4/2019 | |
| CN | 208709539 U | 4/2019 | |
| CN | 208725475 U | 4/2019 | |
| CN | 208725515 U | 4/2019 | |
| CN | 208740650 U | 4/2019 | |
| CN | 208808128 U | 5/2019 | |
| CN | 209031893 U | 6/2019 | |
| CN | 209047874 U | 7/2019 | |
| CN | 209047929 U | 7/2019 | |
| CN | 209060967 U | 7/2019 | |
| CN | 209074131 U | 7/2019 | |
| CN | 209074132 U | 7/2019 | |
| CN | 209074241 U | 7/2019 | |
| CN | 209106931 U | 7/2019 | |
| CN | 209106932 U | 7/2019 | |
| CN | 209121878 U | 7/2019 | |
| CN | 110115495 A | 8/2019 | |
| CN | 110115509 A | 8/2019 | |
| CN | 209202774 U | 8/2019 | |
| CN | 106963229 B | 9/2019 | |
| CN | 209377296 U | 9/2019 | |
| CN | 209377297 U | 9/2019 | |
| CN | 209377303 U | 9/2019 | |
| CN | 209391661 U | 9/2019 | |
| CN | 209436890 U | 9/2019 | |
| CN | 209436893 U | 9/2019 | |
| CN | 110353472 A | 10/2019 | |
| CN | 209474414 U | 10/2019 | |
| CN | 209678165 U | 11/2019 | |
| CN | 106388619 B | 12/2019 | |
| CN | 210018910 U | 2/2020 | |
| CN | 210095498 U | 2/2020 | |
| CN | 110870678 A | 3/2020 | |
| CN | 111110011 A1 * | 5/2020 | ............. A47J 27/00 |
| DE | 861913 C | 1/1953 | |
| EP | 2903486 B1 | 6/2019 | |
| KR | 100503442 B1 | 7/2005 | |
| KR | 2015-0052545 A | 5/2015 | |
| KR | 2019-0130253 A | 11/2019 | |
| KR | 2020-0022895 A | 3/2020 | |
| KR | 20200022895 A1 * | 3/2020 | ............. A47J 36/06 |
| WO | WO-2020009339 A1 * | 1/2020 | ............. A47J 36/06 |
| WO | WO-2020022640 A1 * | 1/2020 | ............. A47J 36/06 |
| WO | WO-2020099693 A1 * | 5/2020 | ............. A47J 36/06 |

OTHER PUBLICATIONS

Machine translation of WO 2020022640 A1 performed on Feb. 26, 2024, Seo (Year: 2020).*
Machine translation of WO 2020099693 A1 performed on Feb. 26, 2024, Pineda (Year: 2020).*
Machine translation of WO 2020009339 A1 performed on Feb. 26, 2024, Seo (Year: 2020).*
Machine translation of CN 111110011 A1 performed on Feb. 28, 2024, Zhang et al. (Year: 2020).*
Extended European Search Report for Application No. EP 21178276.8 dated Oct. 27, 2021, 9 pages.
Extended European Search Report for Application No. EP 21178231.3 dated Oct. 14, 2021, 8 pages.
Extended European Search Report for Application No. EP 21178246.1 dated Oct. 15, 2021, 10 pages.
U.S. Appl. No. 17/335,872, filed Jun. 1, 2021, Han et al.
U.S. Appl. No. 17/335,978, filed Jun. 1, 2021, Han et al.

* cited by examiner

POT LID ASSEMBLY AND COOKING UTENSIL

RELATED APPLICATION

The present application claims priority to Chinese Patent Application Number CN2020210494475, filed Jun. 9, 2020, the entirety of which is hereby incorporated by reference.

FIELD

The present application relates to the field of small household electrical appliances and, more particularly, to a pot lid assembly and cooking utensil.

BACKGROUND

Automatic frying machines are smart cooking appliances that achieve automatic cooking. In comparison with the conventional cooking pot, automatic frying machines have the functions of automatic oil heating, automatic frying and automatic heat control, and are widely popular. An automatic frying machine includes a pot body and a pot lid assembly. The pot lid assembly includes a pot lid, an electric motor fitted to the pot lid, and a stirrer assembly connected to the electric motor. The electric motor causes the stirrer assembly to rotate in order to fry the food ingredients in the pot body. When partway through the cooking process, and addition of ingredients is needed, the pot lid assembly is opened, at which time the stirrer assembly is taken out of the pot body together with the pot lid assembly. However, when the pot lid assembly is refitted, the stirrer assembly will press down on the food ingredients in the pot body, which is not conducive to the refitting of the pot lid assembly, and is otherwise inconvenient.

SUMMARY OF THE DESCRIPTION

The present application provides a pot lid assembly and cooking utensil that is convenient to use.

The present application aims to provide a pot lid assembly configured to be fitted to a pot body. The pot lid assembly comprises a pot lid, an electric motor assembly and a mixing apparatus. The electric motor assembly is fixed to the pot lid. The mixing apparatus includes a stirring rod and a plurality of stirring vanes connected to the stirring rod. The electric motor assembly includes an electric motor. The electric motor includes a rotary shaft operatively connected with the stirring rod so that the electric motor can cause the stirring rod to rotate. The pot lid is configured to cover the pot body to form a closed cooking space. When the pot lid is removed from the pot body, the rotary shaft of the electric motor is disengaged from the stirring rod, and the mixing apparatus can stand in the cooking space of the pot body.

Further, the mixing apparatus includes a plurality of stirring vanes whose bottoms are coplanar, so that the mixing apparatus can stand in the cooking space of the pot body with the stirring vanes serving as a support.

Further, the pot body includes a side wall enclosing the cooking space, with the distance between the ends of the stirring vanes and the side wall greater than or equal to 0.2 mm and smaller than or equal to 10 mm (i.e. 0.2 mm≤distance≤10 mm).

Further, the plurality of stirring vanes are uniformly distributed circumferentially around the stirring rod.

Further, the stirring rod is provided with a magnet disposed at the bottom thereof. The pot body includes a bottom slab located beneath the stirring rod. The bottom slab includes a magnetic attraction layer to which the magnet is attracted so that the mixing apparatus can stand more steadily in the cooking space of the pot body.

Further, one among the rotary shaft and the stirring rod is provided with a reception slot. The end section of the other among the rotary shaft and the stirring rod is received in the reception slot.

Further, the pot lid assembly includes a positioning piece fixed to the pot lid, with the electric motor assembly detachably fitted to the positioning piece.

Further, the electric motor assembly includes a housing, the housing including a first holding section. The pot lid assembly includes a pusher and an elastic piece fitted to the positioning piece. The pusher is provided with a second holding section. One end of the elastic piece is abutted against the positioning piece, and the other end of the elastic piece is abutted against the pusher. The first holding section and the second holding section are engaged such that the electric motor assembly is positioned on the positioning piece. The first holding section and the second holding section can be disengaged by pushing the pusher.

Further, the pot lid includes a top plate section, a fastening piece positioned on the top plate section, and an elastic silicone gel clamping member positioned on the fastening piece. The positioning piece is fixed to the top plate section. The fastening piece wraps around the edges of the top plate section. When the pot lid assembly covers the pot body, the clamping member is pressed against the pot body.

The present application further provides a cooking utensil comprising a pot body and the pot lid assembly as defined above.

When the pot lid assembly of the present application is in use, the mixing apparatus remains in the cooking space of the pot body after the removal of the pot lid. Compared to the problem associated with uneasy reassembly of the pot lid due to the presence of food ingredients after the removal of the mixing apparatus together with the pot lid, the pot lid assembly of the present application enables convenient reassembly of the pot lid. Furthermore, the mixing apparatus standing in the cooking space of the pot body enables convenient reassembly of the pot lid.

DETAILED DESCRIPTION

Here the exemplary embodiments will be described in detail with reference to the accompanying drawings. Unless otherwise stated in the description of the accompanying drawings, it is to be noted that same numerals represent the same or similar elements. The exemplary embodiments described below do not represent all embodiments consistent with the present application. On the contrary, they are merely examples of devices consistent with some aspects of the present application described in detail in the appended claims.

The terms used in the present application are merely intended to describe specific embodiments instead of limiting the present application. Unless otherwise defined, the technical or scientific terms used in the present application shall have ordinary meanings commonly understood by persons of ordinary skills in the art. The terms "first", "second" and the like used in the description and claims of the present application do NOT indicate any sequence, quantity or importance, but are intended to identity different constituent parts. Similarly, words such as "one" or "a" also do NOT indicate quantity limits, but indicates the presence of at least one. "A plurality of" or "several" indicate two or more. Unless otherwise indicated, the terms "front section", "rear section", "lower section" and/or "upper section" and the like are merely intended for facilitating illustration, instead of limiting to a location or spatial orientation. The terms "comprises" or "includes" and the like are intended to refer to the components or items appearing before the words "comprises" or "includes", including the components or items appearing after the words "comprises" or "includes" and their equivalence, and do NOT exclude other components or items. The terms "connect" or "link" and the like are not limited to physical or mechanical connections, and may include electrical connections, be they direct or indirect. Unless otherwise clearly defined by context, the singular forms "a", "the" and "that" used in the description and claims of the present application are intended to include the plurals. It must also be understood that the words "and/or" used herein refer to and include any and all possible combinations of one or a plural number of associated listed items.

Figure 1:
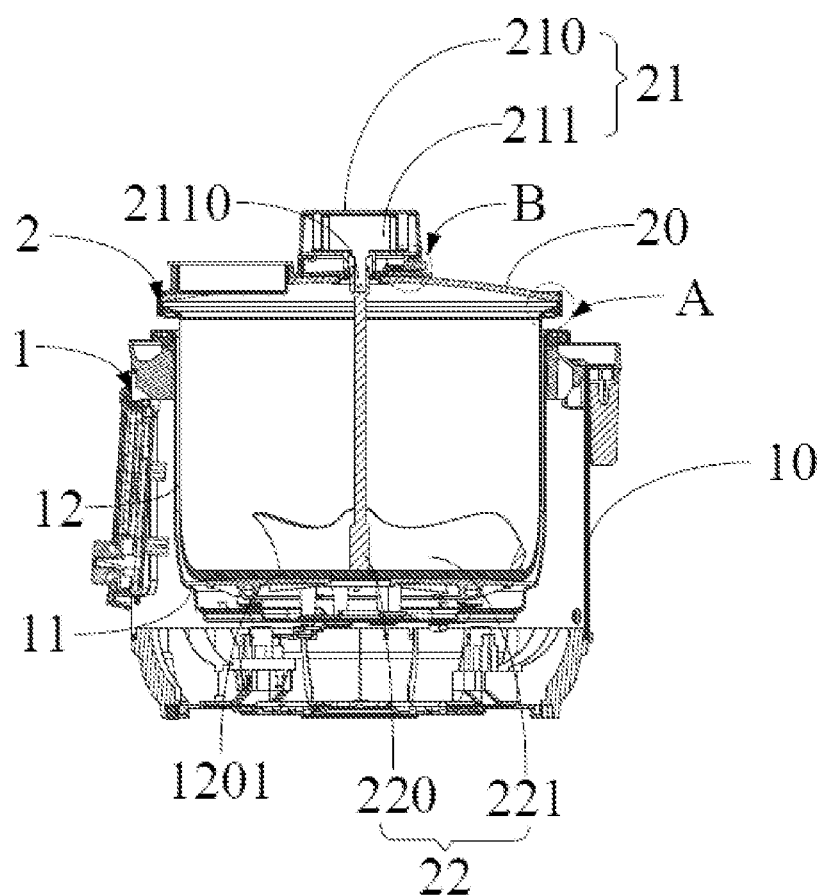
FIG. 1 is a schematic sectional view of a first embodiment of a cooking utensil of the present application.
Figure 2:
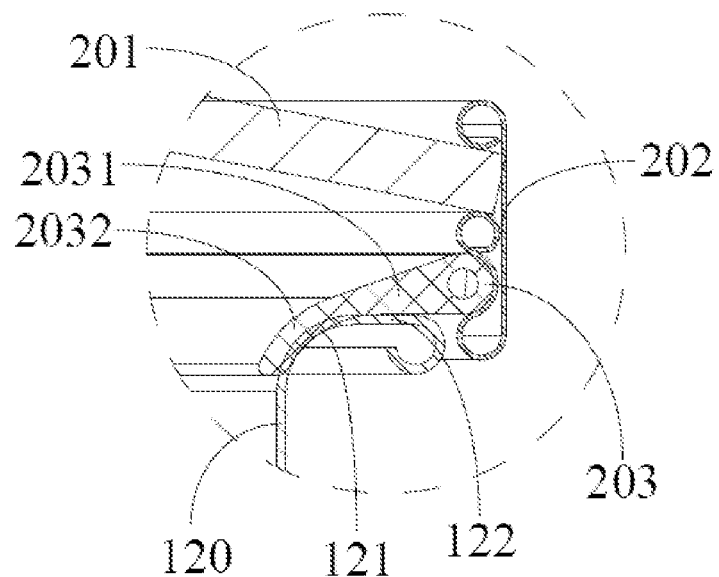
FIG. 2 is an enlarged view at A of the schematic sectional view shown in FIG. 1.

As shown in FIGS. 1 and 2, an electric pressure cooker of the present application comprises a pot body 1 and a pot lid assembly 2. The pot body 1 includes a cooking space, a bottom slab 1201 and a side wall 120 enclosing the cooking space, a curved section 121 extended from the side wall 120, and an edge section 122 extended from the curved section 121. Food ingredients are placed in the cooking space for cooking. The pot lid assembly 2 comprises a pot lid 20, an electric motor assembly 21 and a mixing apparatus 22.

The pot lid 20 is configured to cover the pot body 1 so that a closed cooking space is formed by the pot body 1 and the pot lid 20. The pot lid 20 includes a top plate section 201, a fastening piece 202 positioned on the top plate section 201, and an elastic silicone gel clamping member 203 positioned on the fastening piece 202. The top plate section 201 is made of glass that allows the cooking in the cooking space to be observed. The fastening piece 202 is made of metal, circular in shape, and wraps around the edges of the top plate section 201.

In an embodiment, the pot body 1 includes a plastic housing 10, a thermal insulation casing 11 located in the plastic housing 10, and an inner pot 12 placed in the thermal insulation casing 11. The inner pot 12 can be taken out from the thermal insulation casing 11 for cleaning. The thermal insulation casing 11 is made of metal. The inner pot 12 is configured to contain food. The inner pot 12 includes a bottom slab 1201, a side wall 120, a curved section 121 and an edge section 122. In some embodiments, the inner pot 12 and the plastic housing 10 are integrated into one and not detachable.

The elastic silicone gel clamping member 203 includes a first clamping section 2031 and a second clamping section 2032 extended from the first clamping section 2031. The second clamping section 2032 is curved. The second clamping section 2032 is clamped to the curved section 121 of the pot body 1, while the first clamping section 2031 is clamped to the edge section 122 of the pot body 1 so that the pot lid 20 is supported on the pot body 1.

Figure 3:
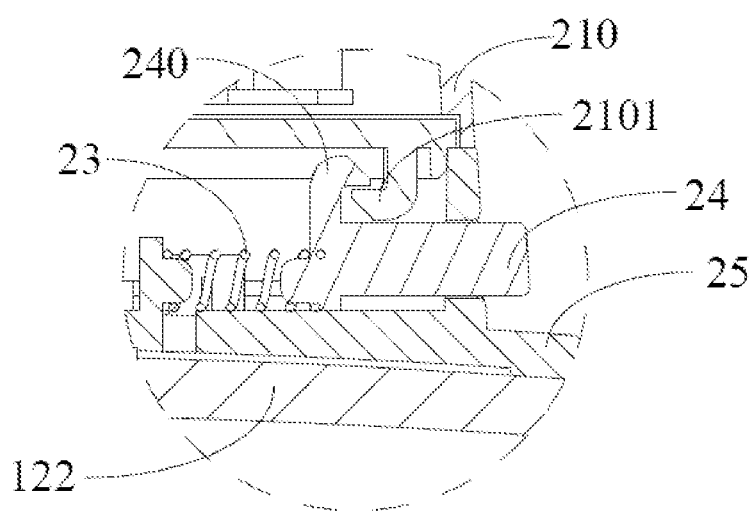
FIG. 3 is an enlarged view at B of the schematic sectional view shown in FIG. 1.

As shown in FIGS. 1 and 3, the pot lid assembly 2 includes a positioning piece 25 fixed to the top plate section 201, an elastic piece 23 and a pusher 24 fitted to the positioning piece 25. The electric motor assembly 21 includes a housing 210 and an electric motor 211 positioned within the housing 210. The housing 210 is provided with a first holding section 2101. The electric motor 211 includes a rotary shaft 2110 extended from the housing 210.

The pusher 24 is provided with a second holding section 240. One end of the elastic piece 23 is abutted against the positioning piece 25, and the other end of the elastic piece 23 is abutted against the pusher 24. When the electric motor assembly 21 is fitted to the positioning piece 25, the first holding section 2101 and the second holding section 240 are engaged, and the elastic force of the elastic piece 23 acts against the pusher 24 and causes the first holding section 2101 and the second holding section 240 to be effectively engaged. When the electric motor assembly 21 needs to be removed, the pusher 24 is pushed, causing the second holding section 240 to move in a direction away from the first holding section 2101 so that the second holding section 240 is disengaged from the first holding section 2101 for the electric motor assembly 21 to be removed. This design effectively ensures the fastening effects on the electric motor assembly 21 and the positioning piece 25, and facilitates fixation of the electric motor assembly 21 to the positioning piece 25.

Figure 4:
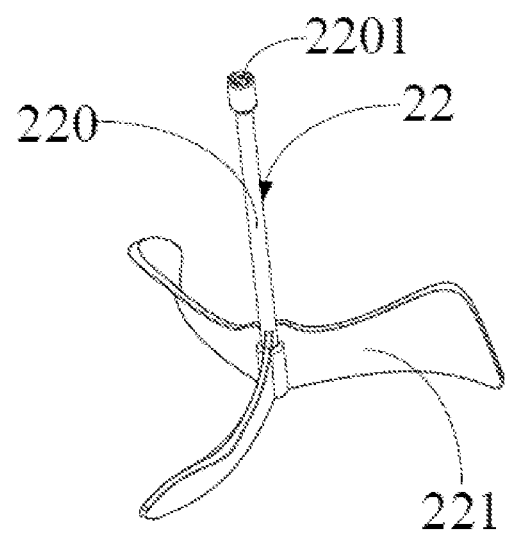
FIG. 4 is an isometric view of the mixing apparatus shown in FIG. 1.
Figure 5:
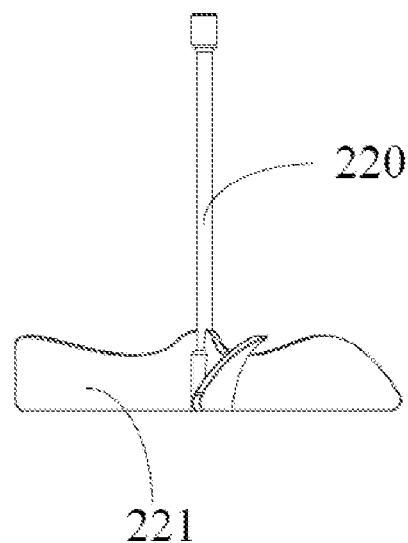
FIG. 5 is a side view of the mixing apparatus shown in FIG. 4.

As shown in FIGS. 4 and 5, the mixing apparatus 22 includes a stirring rod 220 and a plurality of stirring vanes 221 connected to the stirring rod 220. The stirring rod 220 is operatively connected to the rotary shaft 2110 of the electric motor 211 such that the electric motor 211 in operation causes rotation of the rotary shaft 2110 which in turn causes the stirring vanes 221 to rotate for mixing food ingredients. As shown in FIG. 1, the bottom slab 1201 is located beneath the stirring rod 220.

In the embodiment shown, the stirring rod 220 is provided with a reception slot 2201 disposed at the top thereof. The end section of the rotary shaft 2110 is received in the reception slot 2201. The reception slot 2201 is adapted to the end section of the rotary shaft 2110 such that rotation of the rotary shaft 2110 can cause the stirring rod 220 to rotate. The reception slot 2201 may also be arranged on the rotary shaft 2110, with the top of the stirring rod 220 received in the reception slot 2201. The reception slot 2201 and the rotary shaft 2110 may be shape-adapted. For example, the reception slot 2201 and the rotary shaft 2110 are not circular, but generally square, triangular, semicircular or hexagonal.

There is no fastening force between the rotary shaft 2110 of the electric motor 211 and the stirring rod 220. When the pot lid 20 is removed, causing the rotary shaft of the electric motor 211 to be disengaged from the stirring rod 220, the mixing apparatus 22 is made to remain in the cooking space of the pot body 1. The mixing apparatus 22 can stand on the bottom slab 1201 so as to prevent it from slanting or collapsing after the removal of the pot lid 20, which would affect the reassembly. Specifically, the mixing apparatus 22 includes a plurality of stirring vanes 221. The plurality of stirring vanes 221 are uniformly distributed circumferentially around the stirring rod 220. The bottoms of the plurality of stirring vanes 221 are coplanar, so that the mixing apparatus 22 can stand in the cooking space of the pot body 1 with the stirring vanes 221 serving as a support. Preferably, the number of stirring vanes 221 is three.

Once the pot lid assembly 2 is fitted to the pot body 1, the stirring vanes 221 of the mixing apparatus 22 are located in the cooking space of the pot body 1 to mix food ingredients. When partway through the cooking process, and addition of ingredients is needed, the pot lid 20 is removed. Since there is no fastening force between the rotary shaft 2110 of the electric motor 211 and the stirring rod 220, when the pot lid 20 is removed, the rotary shaft 2110 is disengaged from the stirring rod 220 and the mixing apparatus 22 does not get taken out and remains in the cooking space of the pot body 1. After addition of ingredients is completed, the pot lid 20 is made to cover the pot body. Compared to the problem associated with uneasy reassembly of the pot lid 20 due to the presence of food ingredients after the removal of the mixing apparatus 22 together with the pot lid 20, the cooking utensil of the present application enables convenient reassembly of the pot lid 20. Furthermore, the retention of the mixing apparatus 22 in the cooking space of the pot body prevents the problem of uneven frying due to some food ingredients being pressed under the stirring rod 220 when the mixing apparatus 22 is placed into the cooking space of the pot body 1 again, thereby ensuring desirable taste of the processed food.

When the cooking utensil of the present application is in use, the mixing apparatus 22 is first placed in the pot body 1 before food ingredients, after which the pot lid 20 is fitted. This effectively prevents the problem of uneven frying due to some food ingredients being located under the stirring rod 220, thereby ensuring desirable taste of the processed food.

Figure 6:
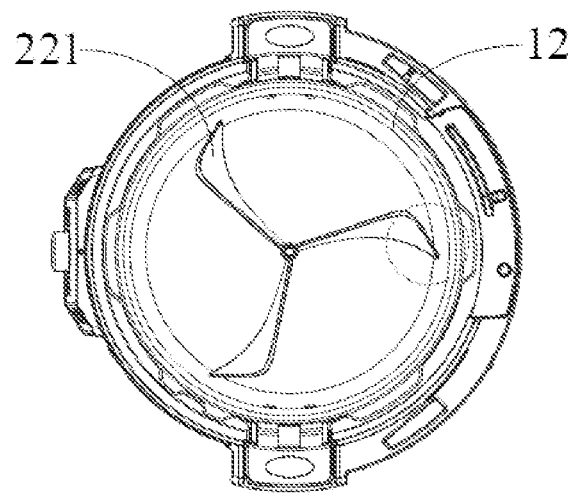
FIG. 6 is a top view of the mixing apparatus shown in FIG. 4, with the mixing apparatus standing in the cooking space of the pot body.
Figure 7:
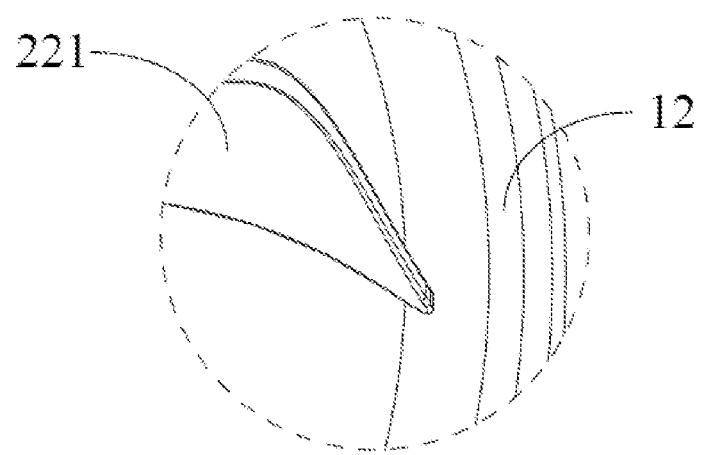
FIG. 7 is an enlarged view of the circled portion of the top view shown in FIG. 6.

As shown in FIGS. 6 and 7, when the mixing apparatus 22 is placed in the pot body 1, the distance between the ends of the stirring vanes 221 and the side wall 120 of the pot body 1 is greater than or equal to 0.2 mm and smaller than or equal to 10 mm (i.e. 0.2 mm≤distance≤10 mm). This prevents scratching of the inner pot 12 during the rotation of the stirring vanes 221 and ensures that the stirring vanes 221 can mix all food ingredients thoroughly.

Figure 8:
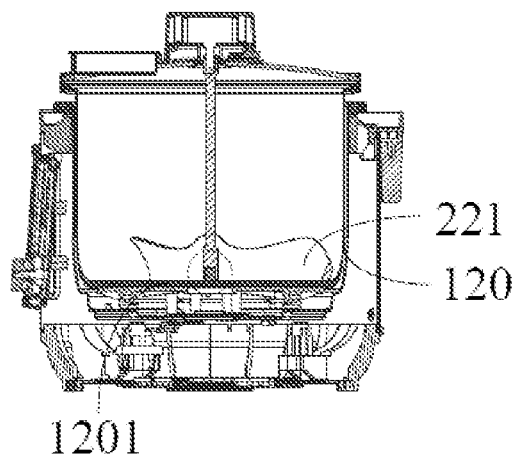
FIG. 8 is a schematic sectional view of a second embodiment of the cooking utensil shown in FIG. 1.
Figure 9:
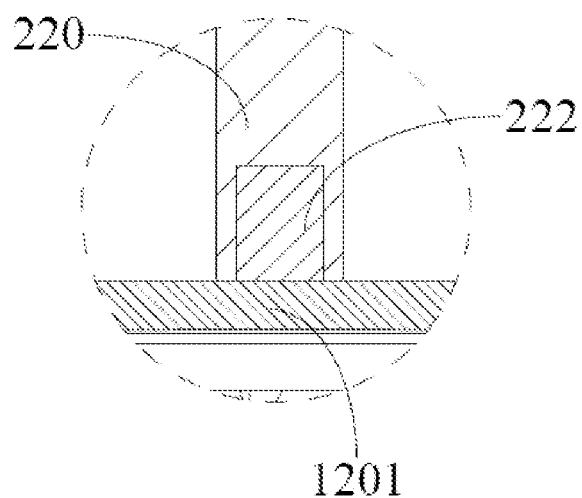
FIG. 9 is an enlarged view of the circled portion of the schematic sectional view shown in FIG. 8.

In a second embodiment shown in FIGS. 8 and 9, the stirring rod 220 is provided with a magnet 222 disposed at the bottom thereof. The bottom slab 1201 includes a magnetic attraction layer to which the magnet 222 is attracted so that the mixing apparatus 22 can stand more steadily in the cooking space of the pot body 1. The magnetic attraction layer may be made of a material attractable by the magnet 222, such as stainless steel. The magnet 222 is a heat resistant magnet that prevents high temperature of the bottom slab 1201 from damaging it.

When the pot lid assembly 2 of the present application is in use, the mixing apparatus 22 remains in the cooking space of the pot body 1 after the removal of the pot lid 20. Compared to the problem associated with uneasy reassembly of the pot lid 20 due to the presence of food ingredients after the removal of the mixing apparatus 22 together with the pot lid 20, the pot lid assembly 2 of the present application enables convenient reassembly of the pot lid 20. Furthermore, the retention of the mixing apparatus 22 in the cooking space of the pot body prevents the problem of uneven frying due to some food ingredients being pressed under the stirring rod 220 when the mixing apparatus 22 is placed into the cooking space of the pot body 1 again, thereby ensuring desirable taste of the processed food. After the removal of the pot lid 20, the mixing apparatus 22 stands in the cooking space of the pot body 1 and this enables convenient reassembly of the pot lid 20.

The foregoing merely describes preferred embodiments of the present application, instead of limiting it in any way. While preferred embodiments of the present application have been disclosed above, they are not intended to limit the present application. Any persons skilled in the art may contemplate equivalent embodiments by making some alteration or modification to the disclosure without departing from the scope of the present application. However, any alteration, equivalent change and modification made without departing from the spirit of the present application shall fall within the scope of protection thereof.

The invention claimed is:

1. A pot lid assembly configured to be fitted to a pot body, the pot lid assembly comprising:
a pot lid, an electric motor assembly, and a mixing apparatus, the electric motor assembly being fixed to the pot lid;
wherein the mixing apparatus comprises a stirring rod and a plurality of stirring vanes connected to the stirring rod;
wherein the electric motor assembly comprises an electric motor, the electric motor having a rotary shaft operatively connected with the stirring rod so that the electric motor can cause the stirring rod to rotate;
wherein the pot lid is configured to cover the pot body to form a closed cooking space;
wherein when the pot lid is removed from the pot body, the rotary shaft of the electric motor is disengaged from the stirring rod, and the mixing apparatus can stand in the cooking space of the pot body, and
wherein the electric motor assembly comprises a first holding section, the pot lid assembly comprises an elastic piece and a pusher with a second holding section, the first holding section and the second holding section are engaged by a default state of the elastic piece pushing the second holding section against the first holding section.

2. The pot lid assembly of claim 1, wherein the mixing apparatus includes a plurality of stirring vanes whose bottoms are coplanar, so that the mixing apparatus can stand in the cooking space of the pot body with the stirring vanes serving as a support.

3. The pot lid assembly of claim 2, wherein the pot body includes a side wall enclosing the cooking space, with a distance between ends of the stirring vanes and the side wall being greater than or equal to 0.2 mm and smaller than or equal to 10 mm (i.e. 0.2 mm≤distance≤10 mm).

4. The pot lid assembly of claim 2, wherein the plurality of stirring vanes is uniformly distributed circumferentially around the stirring rod.

5. The pot lid assembly of claim 1, wherein:
the stirring rod comprises a magnet disposed at the bottom thereof;
the pot body includes a bottom slab located beneath the stirring rod; and,
the bottom slab includes a magnetic attraction layer to which the magnet is attracted so that the mixing apparatus can stand steadily in the cooking space of the pot body.

6. The pot lid assembly of claim 1 wherein one among the rotary shaft and the stirring rod is provided with a reception slot, and an end section of the other among the rotary shaft and the stirring rod is received in the reception slot.

7. The pot lid assembly of claim 1, wherein the pot lid assembly comprises a positioning piece fixed to the pot lid, with the electric motor assembly detachably fitted to the positioning piece.

8. The pot lid assembly of claim 7, wherein:
the electric motor assembly includes a motor housing, the motor housing including the first holding section;
one end of the elastic piece is abutted against the positioning piece, and the other end of the elastic piece is abutted against the pusher;
the first holding section and the second holding section are engaged such that the electric motor assembly is positioned on the positioning piece, and the first holding section and the second holding section can be disengaged by pushing the pusher.

9. The pot lid assembly of claim 7, wherein:
the pot lid comprises a top plate section, a fastening piece positioned on the top plate section, and a clamping member positioned on the fastening piece;
the positioning piece is fixed to the top plate section;
the fastening piece wraps around edges of the top plate section; and,
wherein when the pot lid assembly covers the pot body, the clamping member is pressed against the pot body.

10. A frying machine comprising:
a pot body and a pot lid assembly including a pot lid;
the pot lid configured to cover the pot body to form a closed cooking space;
an electric motor assembly, the electric motor assembly being fixed to the pot lid; and,
a mixing apparatus, the mixing apparatus comprising a stirring rod and at least one stirring vane connected to the stirring rod;
wherein the electric motor assembly comprises an electric motor, the electric motor having a rotary shaft operatively connected with the stirring rod so that the electric motor can cause the stirring rod to rotate;
wherein when the pot lid is removed from the pot body, the rotary shaft of the electric motor is disengaged from the stirring rod, and the mixing apparatus can stand in the cooking space of the pot body, and
wherein the electric motor assembly comprises a first holding section, the pot lid assembly comprises an elastic piece and a pusher with a second holding section, the first holding section and the second holding section are engaged by a default state of the elastic piece pushing the second holding section against the first holding section.

11. The frying machine of claim 10, wherein the mixing apparatus includes a plurality of stirring vanes whose bottoms are coplanar, so that the mixing apparatus can stand in the cooking space of the pot body with the stirring vanes serving as a support.

12. The frying machine of claim 11, wherein the pot body includes a side wall enclosing the cooking space, with a distance between ends of the stirring vanes and the side wall being greater than or equal to 0.2 mm and smaller than or equal to 10 mm (i.e. 0.2 mm≤distance≤10 mm).

13. The frying machine of claim 11, wherein the plurality of stirring vanes is uniformly distributed circumferentially around the stirring rod.

14. The frying machine of claim 10, wherein:
the stirring rod comprises a magnet disposed at the bottom thereof;
the pot body includes a bottom slab located beneath the stirring rod; and,
the bottom slab includes a magnetic attraction layer to which the magnet is attracted so that the mixing apparatus can stand steadily in the cooking space of the pot body.

15. The frying machine of claim 10, wherein one among the rotary shaft and the stirring rod is provided with a reception slot, and an end section of the other among the rotary shaft and the stirring rod is received in the reception slot.

16. The frying machine of claim 10, wherein the pot lid assembly comprises a positioning piece fixed to the pot lid, with the electric motor assembly detachably fitted to the positioning piece.

17. The frying machine of claim 16, wherein:
the electric motor assembly includes a motor housing, the motor housing including the first holding section;
one end of the elastic piece is abutted against the positioning piece, and the other end of the elastic piece is abutted against the pusher;
the first holding section and the second holding section are engaged such that the electric motor assembly is positioned on the positioning piece, and the first holding section and the second holding section can be disengaged by pushing the pusher.

18. The frying machine of claim 16, wherein:
the pot lid comprises a top plate section, a fastening piece positioned on the top plate section, and a clamping member positioned on the fastening piece;
the positioning piece is fixed to the top plate section;
the fastening piece wraps around edges of the top plate section; and,
wherein when the pot lid assembly covers the pot body, the clamping member is pressed against the pot body.

19. A method of covering a pot body, the method comprising:
providing a pot body;
providing a mixing apparatus, the mixing apparatus comprising a stirring rod and a plurality of stirring vanes connected to the stirring rod;
providing a pot lid assembly separate from the mixing apparatus, the pot lid assembly having an electric motor assembly fixed to a pot lid, the electric motor assembly comprising an electric motor having a rotary shaft removably connectable with the stirring rod so that when connected the electric motor can cause the stirring rod to rotate;
engaging the rotary shaft of the electric motor with the stirring rod;
covering the pot body with the pot lid to form a closed cooking space;
wherein the electric motor assembly comprises a first holding section, the pot lid assembly comprises an elastic piece and a pusher with a second holding section; and,
wherein the electric motor assembly is fixed to the pot lid by having the first holding section and the second holding section engaged by a default state of the elastic piece pushing the second holding section against the first holding section.

20. The method of claim 19, further comprising:
removing the pot lid from the pot body while disengaging the rotary shaft of the electric motor from the stirring rod, wherein when the pot lid is removed from the pot body, the mixing apparatus remains standing in the cooking space of the pot body.

* * * * *